United States Patent
Weisman et al.

(10) Patent No.: US 10,803,241 B2
(45) Date of Patent: Oct. 13, 2020

(54) SYSTEM AND METHOD FOR TEXT NORMALIZATION IN NOISY CHANNELS

(71) Applicant: NICE-SYSTEMS LTD., Ra'anana (IL)

(72) Inventors: Hila Weisman, Tel Aviv (IL); Peter Izsak, Nesher (IL); Inna Achlow, Kfar Sirkin (IL); Victor Shafran, Ramat Gan (IL)

(73) Assignee: NICE LTD., Ra'anana (IL)

( * ) Notice: Subject to any disclaimer, the term of this patent is extended or adjusted under 35 U.S.C. 154(b) by 461 days.

(21) Appl. No.: 14/980,056

(22) Filed: Dec. 28, 2015

(65) Prior Publication Data
US 2016/0335244 A1 Nov. 17, 2016

Related U.S. Application Data

(60) Provisional application No. 62/161,494, filed on May 14, 2015.

(51) Int. Cl.
*G06F 40/30* (2020.01)
*G06F 40/211* (2020.01)
(Continued)

(52) U.S. Cl.
CPC .......... *G06F 40/232* (2020.01); *G06F 40/157* (2020.01); *G06F 40/211* (2020.01);
(Continued)

(58) Field of Classification Search
CPC ...... G06F 17/27; G06F 17/20; G06F 17/2705; G06F 17/271; G06F 17/2715;
(Continued)

(56) References Cited

U.S. PATENT DOCUMENTS

2003/0225571 A1* 12/2003 Levin .................. G10L 13/08
704/201
2007/0038436 A1* 2/2007 Cristo .................. G06F 17/273
704/9
(Continued)

OTHER PUBLICATIONS

Aramaki, Eiji, "Typo Corpus", viewable at http://luululu.com/tweet/ (Jan. 17, 2010).
(Continued)

*Primary Examiner* — Lamont M Spooner
(74) *Attorney, Agent, or Firm* — Pearl Cohen Zedek Latzer Baratz LLP (57) ABSTRACT

Systems and methods for text normalization in a plurality of noisy channels receive a text entry and channel origin data of the text entry; determine whether the text entry matches an in-vocabulary (IV) entry or whether the text entry is an out-of-vocabulary (OOV) entry; if the text entry is determined to have a matching IV entry, output the matching IV entry, and if the text entry is determined to be an OOV entry, implement a channel-specific error-type adapter framework based on the channel origin data, wherein the channel-specific error-type adapter framework is optimized for a specific channel from which the text entry originated; normalize the text entry using the channel-specific error-type adapter framework; and output one or more candidate normalized forms of the text entry.

13 Claims, 7 Drawing Sheets (51) Int. Cl.
*G06F 40/284* (2020.01)
*G06F 40/232* (2020.01)
*G06F 40/157* (2020.01)
*G06F 40/242* (2020.01)
*G06F 40/253* (2020.01)

(52) U.S. Cl.
CPC .......... *G06F 40/242* (2020.01); *G06F 40/253* (2020.01); *G06F 40/284* (2020.01); *G06F 40/30* (2020.01)

(58) Field of Classification Search
CPC .. G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/2795
USPC .................................................. 704/1, 9, 10
See application file for complete search history.

(56) References Cited

U.S. PATENT DOCUMENTS

| | | | | |
|---|---|---|---|---|
| 2011/0231182 | A1* | 9/2011 | Weider .............. | G06F 17/30864 704/9 |
| 2012/0072204 | A1* | 3/2012 | Nasri .................. | G06F 17/2229 704/9 |
| 2012/0215533 | A1* | 8/2012 | Aravamudan .... | G06F 17/30253 704/235 |
| 2013/0096911 | A1* | 4/2013 | Beaufort ............... | G06F 17/273 704/9 |
| 2013/0173258 | A1* | 7/2013 | Liu ...................... | G06F 17/2217 704/9 |
| 2013/0197896 | A1* | 8/2013 | Chalabi ............... | G06F 17/2735 704/2 |
| 2014/0303960 | A1* | 10/2014 | Orsini ................. | G06F 17/2854 704/2 |
| 2015/0193431 | A1* | 7/2015 | Stoytchev ............... | G06F 19/18 704/9 |

OTHER PUBLICATIONS

Shannon, C.E. "A Mathematical Theory of Communication" The Bell System Technical Journal vol. 27, pp. 5-83, Oct. 1948, USA.

Cook et. al, An Unsupervised Model for Text Message Normalization, Proceedings of the NAACL HLT Workshop on Computational Approaches to Linguistic Creativity, pp. 71-78 (Jun. 2009).

Han et. al, "Lexical Normalisation of Short Text Message Makn Sens a #twitter" Proceedings of the 49th Annual Meeting of the Association for Computational Linguistics, NICTA Victoria Research Laboratory Department of Computer Science and Softwar Engineering, The University of Melbourne, pp. 368-378 (Jun. 19-24, 2011).

* cited by examiner

FIG. 6 del[X, Y] = Deletion of Y after X

Y (Deleted Letter)

| X | a | b | c | d | e | f | g | h | i | j | k | l | m | n | o | p | q | r | s | t | u | v | w | x | y | z |
|---|---|---|---|---|---|---|---|---|---|---|---|---|---|---|---|---|---|---|---|---|---|---|---|---|---|---|
| a | 0 | 7 | 58 | 21 | 3 | 5 | 18 | 8 | 61 | 0 | 4 | 43 | 5 | 53 | 0 | 9 | 0 | 98 | 28 | 53 | 62 | 1 | 0 | 0 | 2 | 0 |
| b | 2 | 2 | 1 | 0 | 22 | 0 | 0 | 0 | 183 | 0 | 0 | 26 | 0 | 0 | 2 | 0 | 0 | 6 | 17 | 0 | 6 | 1 | 0 | 0 | 0 | 0 |
| c | 37 | 0 | 70 | 0 | 63 | 0 | 0 | 24 | 320 | 0 | 9 | 17 | 0 | 0 | 33 | 0 | 0 | 46 | 6 | 54 | 17 | 0 | 0 | 0 | 1 | 0 |
| d | 12 | 0 | 7 | 25 | 45 | 0 | 10 | 0 | 62 | 1 | 1 | 8 | 4 | 3 | 3 | 0 | 0 | 11 | 1 | 0 | 3 | 2 | 0 | 0 | 6 | 0 |
| e | 80 | 1 | 50 | 76 | 89 | 3 | 1 | 1 | 6 | 0 | 0 | 32 | 9 | 76 | 19 | 9 | 1 | 237 | 223 | 34 | 8 | 2 | 1 | 7 | 1 | 0 |
| f | 4 | 0 | 0 | 0 | 13 | 46 | 0 | 0 | 79 | 0 | 0 | 12 | 0 | 0 | 4 | 0 | 0 | 11 | 0 | 8 | 1 | 0 | 0 | 0 | 1 | 0 |
| g | 25 | 0 | 0 | 2 | 83 | 1 | 37 | 25 | 39 | 0 | 0 | 3 | 0 | 29 | 4 | 0 | 0 | 52 | 7 | 1 | 22 | 0 | 0 | 0 | 1 | 0 |
| h | 15 | 12 | 1 | 3 | 20 | 0 | 0 | 25 | 24 | 0 | 0 | 7 | 1 | 9 | 22 | 0 | 0 | 15 | 1 | 26 | 0 | 0 | 1 | 0 | 1 | 0 |
| i | 26 | 1 | 60 | 26 | 23 | 1 | 9 | 0 | 1 | 0 | 0 | 38 | 14 | 82 | 41 | 7 | 0 | 16 | 71 | 64 | 1 | 1 | 0 | 0 | 1 | 7 |
| j | 0 | 0 | 0 | 0 | 1 | 0 | 0 | 0 | 0 | 0 | 0 | 0 | 0 | 1 | 1 | 0 | 0 | 0 | 0 | 0 | 1 | 0 | 0 | 0 | 0 | 0 |
| k | 4 | 0 | 0 | 1 | 15 | 1 | 8 | 1 | 5 | 0 | 1 | 3 | 0 | 17 | 0 | 0 | 0 | 1 | 5 | 0 | 0 | 0 | 1 | 0 | 0 | 0 |
| l | 24 | 0 | 1 | 6 | 48 | 0 | 0 | 0 | 217 | 0 | 0 | 211 | 2 | 0 | 29 | 0 | 0 | 2 | 12 | 7 | 3 | 2 | 0 | 0 | 11 | 0 |
| m | 15 | 10 | 0 | 0 | 23 | 0 | 0 | 1 | 42 | 0 | 0 | 0 | 180 | 7 | 7 | 31 | 0 | 0 | 9 | 0 | 4 | 0 | 0 | 0 | 0 | 0 |
| n | 21 | 0 | 42 | 71 | 68 | 1 | 160 | 0 | 191 | 0 | 0 | 0 | 17 | 144 | 21 | 0 | 0 | 0 | 127 | 87 | 43 | 1 | 1 | 0 | 2 | 0 |
| o | 11 | 4 | 3 | 8 | 8 | 0 | 5 | 0 | 4 | 1 | 0 | 13 | 9 | 70 | 26 | 20 | 0 | 98 | 20 | 13 | 47 | 2 | 5 | 0 | 1 | 0 |
| p | 25 | 0 | 0 | 0 | 22 | 0 | 0 | 12 | 15 | 0 | 0 | 28 | 1 | 0 | 30 | 93 | 0 | 58 | 1 | 18 | 2 | 0 | 0 | 0 | 0 | 0 |
| q | 0 | 0 | 0 | 0 | 0 | 0 | 0 | 0 | 0 | 0 | 0 | 0 | 0 | 0 | 0 | 0 | 0 | 0 | 0 | 0 | 18 | 0 | 0 | 0 | 0 | 0 |
| r | 63 | 4 | 12 | 19 | 188 | 0 | 11 | 5 | 132 | 0 | 3 | 33 | 7 | 157 | 21 | 2 | 0 | 277 | 103 | 68 | 0 | 10 | 1 | 0 | 27 | 0 |
| s | 16 | 0 | 27 | 0 | 74 | 1 | 0 | 18 | 231 | 0 | 0 | 2 | 1 | 0 | 30 | 30 | 0 | 4 | 265 | 124 | 21 | 0 | 0 | 0 | 1 | 0 |
| t | 24 | 1 | 2 | 0 | 76 | 1 | 7 | 49 | 427 | 0 | 0 | 31 | 3 | 3 | 11 | 1 | 0 | 203 | 5 | 137 | 14 | 0 | 4 | 0 | 2 | 0 |
| u | 36 | 6 | 9 | 10 | 15 | 0 | 1 | 0 | 28 | 0 | 0 | 39 | 2 | 111 | 1 | 0 | 0 | 129 | 31 | 66 | 0 | 0 | 0 | 0 | 1 | 0 |
| v | 9 | 0 | 0 | 0 | 58 | 0 | 0 | 0 | 31 | 0 | 0 | 0 | 0 | 2 | 0 | 0 | 0 | 1 | 0 | 0 | 0 | 0 | 0 | 0 | 1 | 0 |
| w | 40 | 0 | 0 | 1 | 11 | 1 | 0 | 11 | 15 | 0 | 0 | 1 | 0 | 2 | 2 | 0 | 0 | 2 | 24 | 0 | 0 | 0 | 0 | 0 | 0 | 0 |
| x | 1 | 0 | 17 | 0 | 3 | 0 | 0 | 1 | 0 | 0 | 0 | 0 | 0 | 0 | 6 | 0 | 0 | 0 | 5 | 0 | 0 | 0 | 0 | 0 | 1 | 0 |
| y | 2 | 1 | 34 | 0 | 2 | 0 | 1 | 0 | 1 | 0 | 0 | 1 | 2 | 1 | 1 | 1 | 0 | 0 | 17 | 1 | 0 | 0 | 1 | 0 | 0 | 0 |
| z | 1 | 0 | 0 | 0 | 2 | 0 | 0 | 0 | 0 | 0 | 0 | 0 | 0 | 0 | 0 | 0 | 0 | 0 | 0 | 0 | 0 | 0 | 0 | 0 | 0 | 2 |
| @ | 20 | 14 | 41 | 31 | 20 | 20 | 7 | 6 | 20 | 3 | 6 | 22 | 16 | 5 | 5 | 17 | 0 | 28 | 26 | 6 | 2 | 1 | 24 | 0 | 0 | 2 |

FIG. 7

SYSTEM AND METHOD FOR TEXT NORMALIZATION IN NOISY CHANNELS

CROSS-REFERENCE TO RELATED APPLICATION

This application claims the benefit of U.S. Provisional Patent Application No. 62/161,494, filed on May 14, 2015, which is incorporated in its entirety herein by reference.

FIELD OF INVENTION

The present invention relates to the field of textual analysis. More specifically, the present invention relates to systems and methods for normalizing text in a plurality of noisy channels.

BACKGROUND

Contact centers, call centers and/or organizations or businesses utilize various means to interact with clients, customers or other parties. In particular, electronic mail (e-mail), chat applications, text messaging services (e.g., Short Message Service (SMS) and Multimedia Message Service (MMS) messages), and even Social Media applications/websites (e.g., Twitter®, Facebook®, etc.) are common communication channels in modern contact or call centers. With the myriad communication channels available, there is an increasing problem of conducting Multi-Channel Interaction Analytics: gaining insight from collaborated data sources.

Today, end users interact with companies using websites, mobile applications, text messages and social media platforms. Moreover, the agents themselves are typically required to document the call flow and content in a fast-paced call center surrounding. Within these channels there are varying degrees of creativity and domain-specific terms. These lexical variations may make it hard for statistical algorithms to collect sufficient and/or correct data, for categorization engines to identify relevant calls, and/or for LVCSR (large-vocabulary continuous speech recognition) algorithms to correctly identify out-of-vocabulary (OOV) words vs. erroneous words.

Presently, there are a variety of existing text normalization methods for individual channels of text input; however these current methods typically do not address the challenges associated with multi-channel communications. Furthermore, as explained in detail below, these current methods typically do not address individual channels using the novel methods according to embodiments of the invention described herein. One such solution proposes normalizing mail messages which usually include formatting noise.

Another solution proposes to correct an input phrasal string by segmenting the string into a plurality of different segmentations, comparing each segmentation to dictionary entries using the dictionary looping technique, assigning a cost to each segmentation, and determining an output string by finding the segmentation having the lowest cost.

Paul Cook and Suzanne Stevenson ("An unsupervised model for text message normalization", Proceedings of the workshop on computational approaches to linguistic creativity. Association for Computational Linguistics, 2009) modeled the probabilities of abbreviation and acronym errors as a constant for specific types of abbreviation forms. Bo Han and Timothy Baldwin ("Lexical normalisation of short text messages: Makn sens a # twitter", Proceedings of the 49th Annual Meeting of the Association for Computational Linguistics: Human Language Technologies-Volume 1. Association for Computational Linguistics, 2011) used a Support Vector Machine (SVM) for detecting ill-formed words and based their language models on gathered Twitter data. Furthermore, they do not deal with abbreviation type of errors, and rely on a fully supervised model.

SUMMARY OF EMBODIMENTS OF THE INVENTION

An embodiment of the invention includes a system and method for text normalization in a plurality of noisy channels. Embodiments may be performed on a computer, for example, having a processor, memory, and one or more code sets stored in the memory and executing in the processor. In some embodiments, the method may include receiving a text entry and channel origin data of the text entry; determining whether the text entry matches an in-vocabulary (IV) entry or whether the text entry is an out-of-vocabulary (OOV) entry; if the text entry is determined to have a matching IV entry: outputting the matching IV entry; and if the text entry is determined to be an OOV entry: implementing a channel-specific error-type adapter framework based on the channel origin data; in which the channel-specific error-type adapter framework is optimized for a specific channel from which the text entry originated; normalizing the text entry using the channel-specific error-type adapter framework; and outputting one or more candidate normalized forms of the text entry.

In some embodiments, the channel-specific error-type adapter framework may include one or more error-type adapters; and each error-type adaptor may be configured to model a different type of error to be normalized. Some embodiments may include an initial step of building an interpolated language model and one or more static lexicons to be implemented when normalizing the text entry using the channel-specific error-type adapter framework. In some embodiments, the interpolated language model comprises a merged combination of a basic language model and one or more channel-specific language models. In some embodiments, the one or more static lexicons may include at least one of a proper name lexicon, an abbreviation lexicon, and an acronym lexicon. In some embodiments, the one or more error-type adapters may include at least one of a spelling error-type adapter, an abbreviation error-type adapter, an acronym error-type adapter, a phonetic shorthand error-type adapter, and a word concatenation error-type adapter.

In some embodiments, the spelling error-type adapter is generated using one or more matrices, each matrix computing a probability of a specific edit operation being performed to identify a spelling error correction. In some embodiments, the channel-specific error-type adapter framework further may include a probabilistic model of one or more error-type priors. Some embodiments may further include applying linguistic heuristics to expand the channel-specific error-type adapter framework.

In accordance with further embodiments, systems may be provided, which may be configured to perform embodiments of the methods described herein. These and other aspects, features and advantages will be understood with reference to the following description of certain embodiments of the invention.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

FIG. 7 is an example confusion matrix generated according to embodiments of the invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF EMBODIMENTS OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory processor-readable storage medium that may store instructions, which when executed by the processor, cause the processor to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof may occur or be performed simultaneously, at the same point in time, or concurrently.

Embodiments of the invention can provide systems and methods for text normalization in a plurality of noisy channels by first investigating and comparing the prevalent OOV types (e.g., abbreviations, spelling errors, typos, proper names, etc.) of each channel. Based on this investigation, a normalization framework is built which includes, e.g., three components: an OOV detector, a spell corrector, and an abbreviations corrector. Each of these components may be adapted to a specific channel, with the understanding that the "noise" of a particular channel is dependent on that channel (e.g., dependent on the type of channel and the nature of communications in that channel). In some embodiments, the components may be factored, while keeping the distinction between each channel, into a unified model or framework which outputs the most probable correction for a given noisy word. Each such component may be built using minimal supervision, e.g., incorporating linguistic knowledge with Machine Learning methods.

Embodiments of the invention may differ from currently available solutions for at least the following reasons: (1) current solutions fail to deal with the plurality of OOV types (e.g., different types of words which are OOV for various reasons) and (2) current solutions typically do not work in a Multi-Channel setting. Embodiments of the invention address the Multi-Channel setting by, for example, modeling the "noise" as dependent on the channel, and/or implementing a per-channel adaptation. Furthermore, embodiments of the invention consolidate many channels into one normalized representation. In addition, a novel framework for spelling and abbreviation detection and correction is implemented.

As explained in detail herein, addressing the Multi-Channel setting may be accomplished according to embodiments of the invention by, for example, implementing two main components: a framework consisting of error-type adaptors and a normalization (production) component. The framework can include one of multiple error-type adaptors. In some embodiments, each adaptor is configured to model a different type of error to be normalized. For example, embodiments of the invention provide a spelling error-type adapter and/or an abbreviation error-type adapter (e.g., abbreviation corrector). The normalization component may then receive new interactions (e.g., a single text entry, a stream of words, etc.), OOV entries, and output a list of possible (candidate) normalized forms of the OOV text entry (e.g., OOV word) according to the error type adaptors' suggestions.

These and other features of embodiments of the invention will be further understood with reference to FIGS. 1-7 as described herein.

Figure 1:
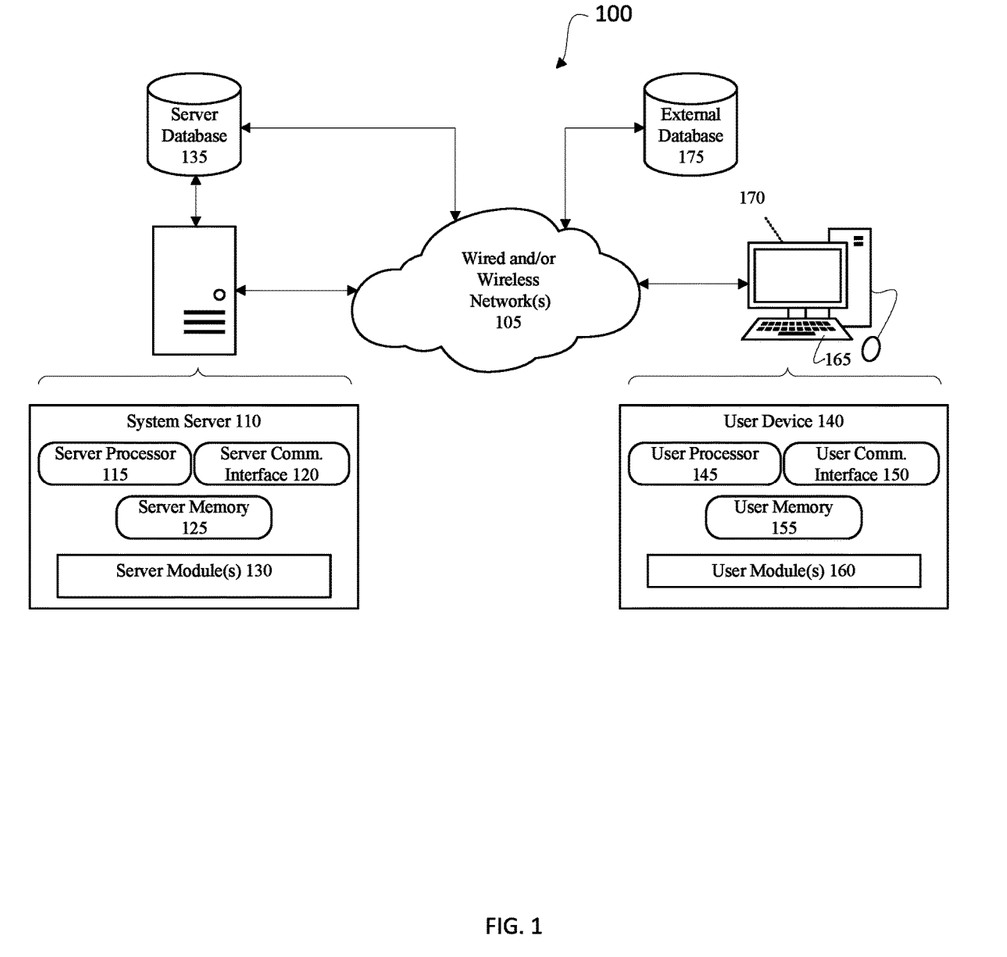
FIG. 1 is a high level diagram illustrating an example configuration of a system for text normalization in a plurality of noisy channels according to at least one embodiment of the invention.

FIG. 1 shows a high level diagram illustrating an exemplary configuration of a system 100 for performing one or more aspects of the invention described herein, according to at least one embodiment of the invention. System 100 includes network 105, which may include the Internet, one or more telephony networks, one or more network segments including local area networks (LAN) and wide area networks (WAN), one or more wireless networks, or a combination thereof. System 100 also includes a system server 110 constructed in accordance with one or more embodiments of the invention. In some embodiments, system server 110 may be a stand-alone computer system. In other embodiments, system server 110 may include a network of operatively connected computing devices, which communicate over network 105. Therefore, system server 110 may include multiple other processing machines such as computers, and more specifically, stationary devices, mobile devices, terminals, and/or computer servers (collectively, "computing devices"). Communication with these computing devices may be, for example, direct or indirect through further machines that are accessible to the network 105.

System server 110 may be any suitable computing device and/or data processing apparatus capable of communicating with computing devices, other remote devices or computing networks, receiving, transmitting and storing electronic information and processing requests as further described herein. System server 110 is, therefore, intended to represent various forms of digital computers, such as laptops, desktops, workstations, personal digital assistants, servers, blade servers, mainframes, and other appropriate computers and/or networked or cloud based computing systems capable of employing the systems and methods described herein.

System server 110 may include a server processor 115 which is operatively connected to various hardware and software components that serve to enable operation of the system 100. Server processor 115 serves to execute instructions to perform various operations relating to advanced search, and other functions of embodiments of the invention as described in greater detail herein. Server processor 115 may be one or a number of processors, a central processing unit (CPU), a graphics processing unit (GPU), a multi-processor core, or any other type of processor, depending on the particular implementation.

System server 110 may be configured to communicate via communication interface 120 with various other devices connected to network 105. For example, communication interface 120 may include but is not limited to, a modem, a Network Interface Card (NIC), an integrated network interface, a radio frequency transmitter/receiver (e.g., Bluetooth wireless connection, cellular, Near-Field Communication (NFC) protocol, a satellite communication transmitter/receiver, an infrared port, a USB connection, and/or any other such interfaces for connecting the system server 110 to other computing devices and/or communication networks such as private networks and the Internet.

In certain implementations, a server memory 125 is accessible by server processor 115, thereby enabling server processor 115 to receive and execute instructions such as a code, stored in the memory and/or storage in the form of one or more software modules 130, each module representing one or more code sets. The software modules 130 may include one or more software programs or applications (collectively referred to as the "server application") having computer program code or a set of instructions executed partially or entirely in server processor 115 for carrying out operations for aspects of the systems and methods disclosed herein, and may be written in any combination of one or more programming languages. Server processor 115 may be configured to carry out embodiments of the present invention by, for example, executing code or software, and may execute the functionality of the modules as described herein.

In accordance with embodiments of FIG. 1, the exemplary software modules may include a communication module and other modules as described here. The communication module may be executed by server processor 115 to facilitate communication between system server 110 and the various software and hardware components of system 100, such as, for example, server database 135, client device 140, and/or external database 175 as described herein.

Of course, in some embodiments, server modules 130 may include more or less actual modules which may be executed to enable these and other functionalities of the invention. The modules described herein are, therefore, intended to be representative of the various functionalities of system server 110 in accordance with some embodiments of the invention. It should be noted that, in accordance with various embodiments of the invention, server modules 130 may be executed entirely on system server 110 as a stand-alone software package, partly on system server 110 and partly on user device 140, or entirely on user device 140.

Server memory 125 may be, for example, a random access memory (RAM) or any other suitable volatile or non-volatile computer readable storage medium. Server memory 125 may also include storage which may take various forms, depending on the particular implementation. For example, the storage may contain one or more components or devices such as a hard drive, a flash memory, a rewritable optical disk, a rewritable magnetic tape, or some combination of the above. In addition, the memory and/or storage may be fixed or removable. In addition, memory and/or storage may be local to the system server 110 or located remotely.

In accordance with further embodiments of the invention, system server 110 may be connected to one or more database(s) 135, for example, directly or remotely via network 105. Database 135 may include any of the memory configurations as described herein, and may be in direct or indirect communication with system server 110. In some embodiments, database 135 may store information relating to user documents. In some embodiments, database 135 may store information related to one or more aspects of the invention.

As described herein, among the computing devices on or connected to the network 105 may be one or more user devices 140. User device 10 may be any standard computing device. As understood herein, in accordance with one or more embodiments, a computing device may be a stationary computing device, such as a desktop computer, kiosk and/or other machine, each of which generally has one or more processors, such as user processor 145, configured to execute code to implement a variety of functions, a computer-readable memory, such as user memory 155, a user communication interface 150, for connecting to the network 105, one or more user modules, such as user module 160, one or more input devices, such as input devices 165, and one or more output devices, such as output devices 170. Typical input devices, such as, for example, input devices 165, may include a keyboard, pointing device (e.g., mouse or digitized stylus), a web-camera, and/or a touch-sensitive display, etc. Typical output devices, such as, for example output device 170 may include one or more of a monitor, display, speaker, printer, etc.

In some embodiments, user module 160 may be executed by user processor 145 to provide the various functionalities of user device 140. In particular, in some embodiments, user module 160 may provide a user interface with which a user of user device 140 may interact, to, among other things, communicate with system server 110

Additionally or alternatively, a computing device may be a mobile electronic device ("MED"), which is generally understood in the art as having hardware components as in the stationary device described above, and being capable of embodying the systems and/or methods described herein, but which may further include componentry such as wireless communications circuitry, gyroscopes, inertia detection circuits, geolocation circuitry, touch sensitivity, among other sensors. Non-limiting examples of typical MEDs are smartphones, personal digital assistants, tablet computers, and the like, which may communicate over cellular and/or Wi-Fi networks or using a Bluetooth or other communication protocol. Typical input devices associated with conventional MEDs include, keyboards, microphones, accelerometers, touch screens, light meters, digital cameras, and the input jacks that enable attachment of further devices, etc.

In some embodiments, user device 140 may be a "dummy" terminal, by which processing and computing may be performed on system server 110, and information may then be provided to user device 140 via server communication interface 120 for display and/or basic data manipulation. In some embodiments, modules depicted as existing on and/or executing on one device may additionally or alternatively exist on and/or execute on another device. For example, in some embodiments, one or more modules of server module 130, which is depicted in FIG. 1 as existing and executing on system server 110, may additionally or alternatively exist and/or execute on user device 140. Likewise, in some embodiments, one or more modules of user module 160, which is depicted in FIG. 1 as existing and executing on user device 140, may additionally or alternatively exist and/or execute on system server 110.

Figure 2:
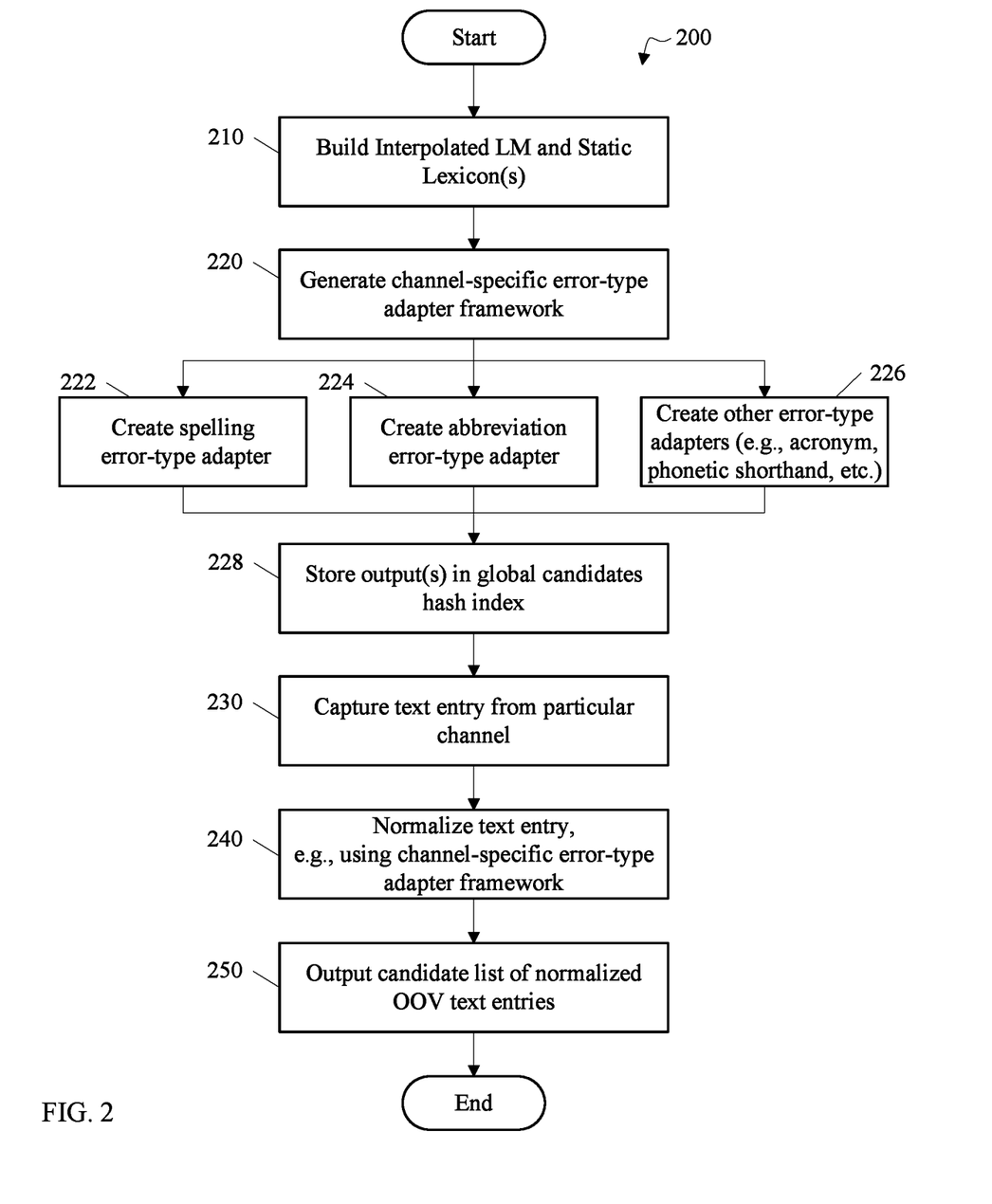
FIG. 2 is a high level diagram illustrating an example configuration of a method workflow for text normalization in a plurality of noisy channels according to at least one embodiment of the invention.

FIG. 2 is a high level diagram illustrating an example configuration of a method workflow 200 for text normalization in a plurality of noisy channels according to at least one embodiment of the invention. As described herein, embodiments of systems and methods of the invention include at least two main components or modules: a framework consisting of error-type adaptors, and a normalization (production) component (also referred to herein as a "normalizer"). The framework consists of a Language Modelling (LM) stage during which a base LM is infused with certain channel-specific characteristics. OOV entries (e.g., words, text, phrases, and/or other alphabetic and/or alpha-numeric strings, etc.) are annotated, e.g., manually by a research assistant, or in some automated process, e.g., by a computer implementing artificial intelligence, in order to model different types of errors in the particular channel. Finally, an OOV detector that is used by the normalization component (normalizer) may be built using the new LM along with various constructed lexicons associated with a particular channel or channels.

As described in detail herein, the framework may include one or more error-type adapters. An error-type adapter is a component that models a particular type of error and provides correction suggestions (e.g., a spelling error corrector). Each error-type adapter may provide an index of candidate correct words (with the index built, e.g., using the LM) and possible erroneous candidates that might occur with a probability of occurrence. In accordance with further embodiments of the invention, the normalization (production) component may then be used during a Normalization (production) Stage in which the normalizer receives unseen words from interactions (e.g., one or more text entries) in a given channel, implements the relevant channel-specific error-type adapter framework based on the channel origin data of the interactions, and outputs one or more candidate normalized forms of a given text entry.

In some embodiments, method workflow 200 may be performed on a computer (e.g., system server 110) having a processor (e.g., server processor 115), memory (e.g., server memory 125), and one or more code sets or software (e.g., server module(s) 130) stored in the memory and executing in or executed by the processor. Method workflow 200 begins at operation 210, in which steps are taken (described in detail with reference to FIG. 3) to build an interpolated LM and/or static lexicons for use by the normalizer in OOV detection in a particular channel of the plurality of channels. In some embodiments, operation 210 may be executed for each channel of the plurality of channels. At operation 220, a channel-specific error-type adapter framework may be generated for each specific channel from which text entries may originate. In some embodiments, generation of a channel-specific error-type adapter framework may include creating one or more of a plurality of error-type adapters, including, for example, the following: at step 222 creating a spelling error-type adapter (described in detail with reference to FIG. 4); at step 224 creating an abbreviation error-type adapter, e.g., by creating and ranking normalized candidates of abbreviations (described in detail with reference to FIG. 5); and/or at step 226 creating one or more other error-type adapters such as, for example, an acronym error-type adapter, a phonetic shorthand error-type adapter, a stylistic variation error-type adapter, a word concatenation error-type adapter, etc.

In some embodiments, generation of a channel-specific error-type adapter framework may include a step 228 in which outputs or results of creating the various error-type adapters (denoted as a candidates list) are stored and/or assembled, e.g., in a global candidates hash index in which the key is a correct word or text form and the values are erroneous forms with associated calculated probabilities. In some embodiments, the candidate index may be provided to the normalizer as described herein to be used in evaluating newly received text entries (e.g., words) for the channel for which the channel-specific error-type adapter framework was generated.

Method workflow 200 may continue at operation 230, when a text entry is captured or recorded in a particular channel, and/or is otherwise received at the processor, from, e.g., part of an interaction, a stream of one or more words, phrases, etc., which originated in the particular channel. As understood herein, a text entry may be any word, phrase, or any other defined group or string of characters (e.g., letters, numbers, symbols, punctuation, or any combination thereof) provided to the processor to be evaluated by the system in accordance with embodiments of the invention. For example, a text entry may be a word used in a chat communication channel between a customer and an agent in a call center or other enterprise setting. In some embodiments, such interactions may be captured and/or streamed by the system in real-time, e.g., to provide immediate Text Analytics, Natural Language Processing (NLP), and/or other feedback, etc. In other embodiments, text entries in a channel may be captured, recorded, saved, etc., and stored, e.g., in a database, for future analysis, and provided to the processor at a later point, e.g., after an interaction has been completed. In some embodiments, a text entry may be received as part of search query.

At operation 240, during a Normalization Stage, a received text entry may be provided to the normalizer, which receives the captured text entry, as well as channel origin data (e.g., information indicating from which channel the text entry originated) and normalizes the text entry using the channel-specific error-type adapter framework of the given channel (described in detail with reference to FIG. 6). At operation 250, the normalizer may output a list of possible (candidate) normalized forms of the OOV text entry (e.g., an OOV word) according to the error type adaptors' suggestions (also described in detail with reference to FIG. 6).

Figure 3:
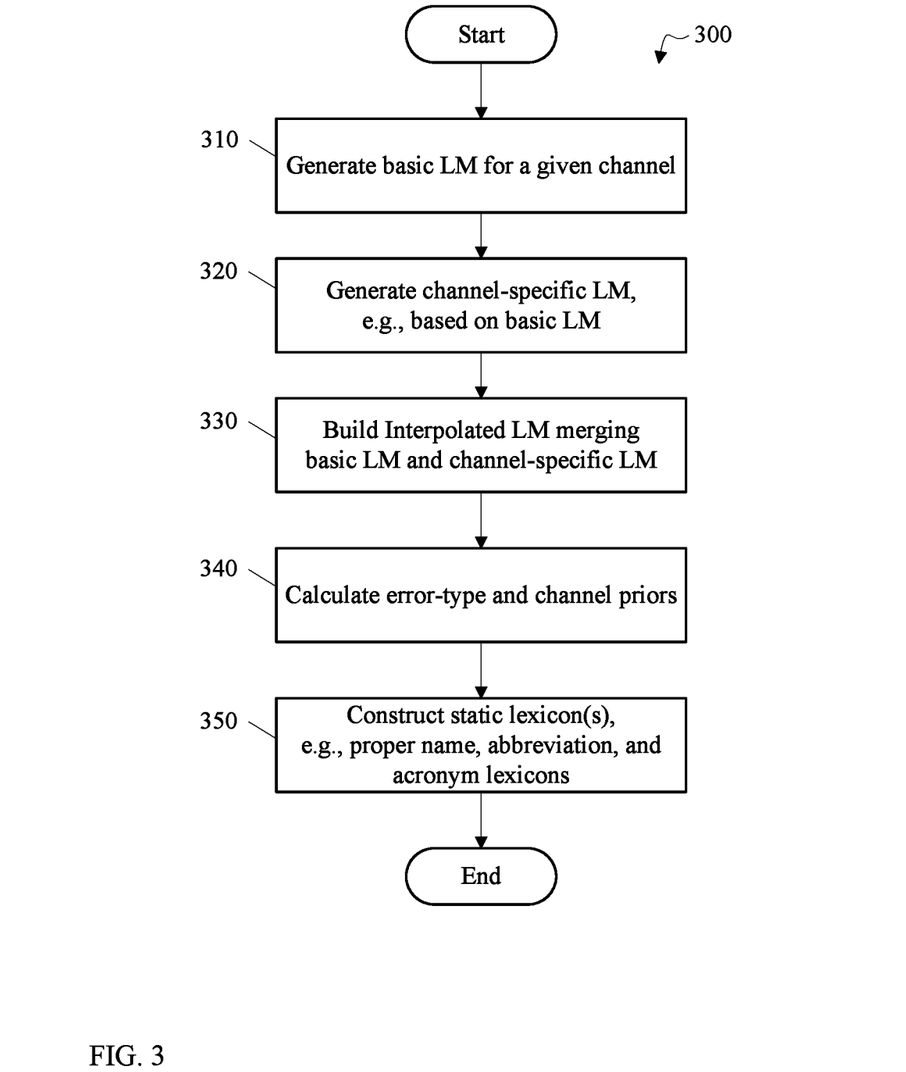
FIG. 3 is a method diagram for building an interpolated language model and/or static lexicons for use by a normalizer in OOV detection in a particular channel of a plurality of channels, according to embodiments of the invention.

Turning now to FIG. 3, a method 300 for building an interpolated LM and/or static lexicons for use by the normalizer in OOV detection in a particular channel of a plurality of channels is described according to embodiments of the invention. Method 300 begins at step 310, when the processor generates a basic (e.g., initial) LM for a given channel as described herein. In some embodiments, the processor may first collect large amounts of text from corpora annotated with POS (Part Of Speech) information. Such corpora may be collected from a single source, e.g., a database, or from a plurality of sources. The processor may then compute a Unigram Language Model probability for each word in the corpus, as explained herein.

As understood herein, a Language Model may be defined as a probability distribution over sequences of words. Given such a sequence, e.g., of length m, a language model may assign a probability $P(w_1, \ldots, w_m)$ to the whole sequence. Having a way to estimate the relative likelihood of different phrases may be useful in many natural language processing applications. Language modeling is used in speech recognition, machine translation, part-of-speech tagging, parsing, handwriting recognition, information retrieval, and other applications. A Unigram Language Model, often used in information retrieval, may be understood as a particular form of LM which splits the probabilities of different terms in a context, e.g., from $P(t_1 t_2 t_3)=P(t_1) \, P(t_2|t_1) \, P(t_3|t_1 t_2)$ to $P_{uni}(t_1 t_2 t_3)=P(t_1) \, P(t_2) \, P(t_3)$. Once probabilities are calculated for each word, the processor may then filter words with a frequency below a predefined frequency threshold. In some embodiments, the frequency threshold may be set after first skimming through, e.g., the bottom 20% of words in order to confirm the accuracy of the frequency threshold.

Next, at step 320, the processor may generate a channel-specific LM, e.g., based on the basic LM generated in step 310. In some embodiments, the processor may first output all OOV words, from a specific channel, by using the LM obtained in step 310. Then the processor may rank each of the OOV words according to frequency and present a sufficient amount of top frequency words for analysis, e.g., manually by a research assistant, or in some automated process, e.g., by a computer implementing artificial intelligence. In some embodiments, each OOV word may be annotated, labeled, and/or otherwise indicated as one of the following: the word needs to be normalized (e.g., it is a "noisy word"); or the word is correct (but needs to be added to the LM). In some embodiments, for each OOV word marked as a "noisy word", the OOV word may be annotated to indicate its correct (normalized) form. In some embodiments, an indication of whether the OOV word is an abbreviation or an acronym may also be provided. An example table of annotated noisy works is shown in Table 1 below:

TABLE 1

Example of noisy words annotation

| OOV word | Normalized form | Abbreviation/Acronym? |
|---|---|---|
| Apt | Appointment | Abbreviation |
| Tarif | Tariff | — |

At step 330, the processor may build an interpolated LM (e.g., a merged combination), merging the basic LM generated at step 310 with the channel-specific LM generated at step 320. In some embodiments, as part of building the interpolated LM, at step 340 the processor may calculate one or more probabilistic error-type priors and/or channel priors, in which:

P(c|channel)=the normalized frequency of a word 'c' in the channel

P(type|channel)=the normalized frequency of error-type 'type' in the channel (e.g., obtained by the annotations from step 320).

In some embodiments, once the interpolated LM has been built, at step 350 the processor may construct one or more static lexicons for use with the interpolated LM. For example, in some embodiments, a proper name lexicon (e.g., brand-names, surnames, location, companies, etc.) may be constructed. Additionally or alternatively, in some embodiments an Abbreviations lexicon and/or an Acronyms lexicon may be constructed, among other possible lexicons. In some embodiment, one or more (and typically all) of these lexicons may be added to the channel-specific words annotated in step 320. The addition of such lexicons serves to further differentiate the channel-specific LM for a given channel. As described herein, an OOV detector that is used by the normalization component (e.g., the normalizer) may be built using the new interpolated LM along with one or more of the various constructed lexicons associated with a particular channel or channels.

Figure 4:
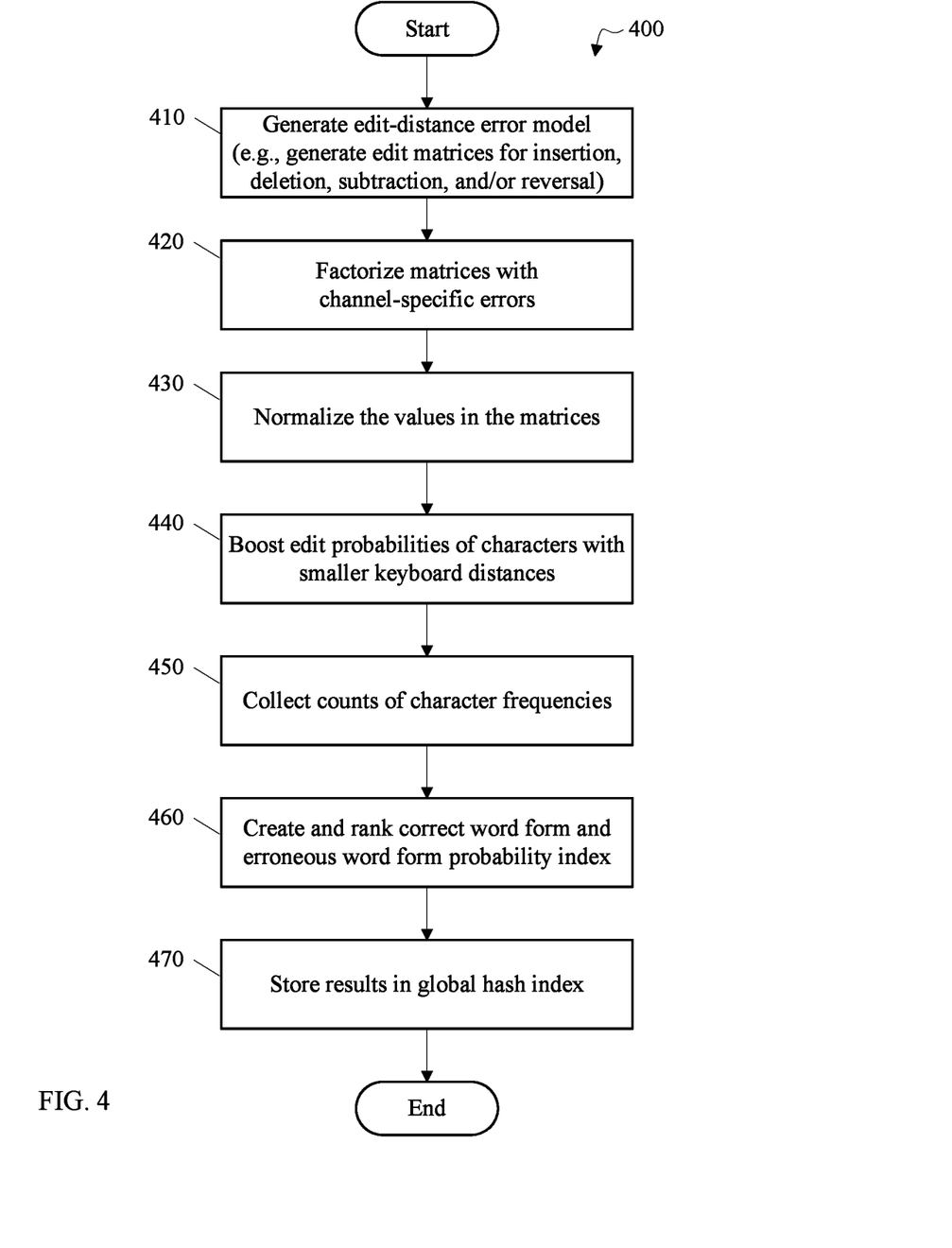
FIG. 4 is a method diagram for creating a spelling error-type adapter according to embodiments of the invention.

Turning now to FIG. 4, a method 400 for creating a spelling error-type adapter is described according to embodiments of the invention. In some embodiments, a spelling error-type adaptor may be created based, for example, on the Noisy Channel model, which takes into account the various ways people misspell words. The Noisy Channel model (Shannon, 1948) has been successfully applied to a wide range of problems, including spelling correction. The model typically consists of two components: a source model and a channel model. A source model refers to the original communication model that, for example, a user wants to communicate. Channel model refers to the model of the actual communication channel which could include noise, for example in a text communication a misspelled word or a missing character.

For many applications, people have devoted considerable energy to improving both components, with resulting improvements in overall system accuracy. In accordance with embodiments of the invention, for each word in the interpolated LM produced in embodiments of method 300 described herein, the processor may create all possible words within a predefined edit distance, e.g., an edit distance of two. This can be accomplished, for example, by incorporating the Damerau-Levenshtein method, which uses four types of operations: insertion, deletion, substitution, and reversal.

Briefly, the Damerau-Levenshtein method generally measures a distance (string metric) between two strings, i.e., finite sequence of symbols, given by counting the minimum number of operations needed to transform one string into the other, where an operation is defined as an insertion, deletion, or substitution of a single character, or a transposition (reversal) of two adjacent characters.

In some embodiments the probability of each edit operation may be computed by generating or otherwise employing a set of matrices, as described herein. The probabilities of operations (e.g., probability of spelling errors) may be learnt, e.g., from freely-available corpora and then interpolated with the probability of operations detected in the errors (noisy words) in method 300, with the probability of spelling errors being based on keyboard distance and/or phonetic distance, as described herein. The spelling error-type adapter may be generated using one or more confusion matrices, each confusion matrix computing a probability of a specific edit operation being performed to identify a spelling error correction.

Method 400 begins at step 410, when the processor generates an edit-distance error model. In particular, in accordance with embodiments of the invention the processor may generate one or more matrices, e.g., four matrices, one for each edit operation (insertion, deletion, substitution, and reversal), and populate each matrix with probabilities from an initial external corpus (such as, for example, the Twitter Typo Corpus, available at http://luululu.com/tweet/). Of course, in other embodiments, more or less than four matrices may also be generated. An example of such a matrix (e.g., for the delete operation) can be seen in FIG. 7. In some embodiments, each matrix, denoted as C, contains N rows and N columns, where N is the number of characters in the alphabet (with '@' in this example being used as a special character denoting the start position of a word) and C[i,j] is the frequency of an operation that uses the characters in index i and j. For example, in matrix del[X,Y], C[i,j] holds the number of times the character at position j was deleted after the character at position i. Obviously, similar matrices may be generated for each edit operation.

At step 420, in some embodiments, the processor may factorize the one or more matrices generated in step 410 with the channel-specific error, e.g., to infuse the matrices with the characteristics of the error model. Factorizing, as understood herein, may refer to updating or adding to the matrix the number of times a given edit operation (e.g., insertion, deletion, substitution, and reversal) has been use based on the model built for a given error channel. To accomplish this, in some embodiments the processor may obtain the edit operations for each noisy word, as well as the correct form (e.g., using Damerau-Levenshtein method) for words which are up to a predefined number of edit operations (e.g., 2) from their correct form. The processor may be then update the correct operation matrix for each operation. Once each matrix has been updated, at step 430 the processor may normalize the values in the matrices, e.g., by dividing each value in a given matrix by the maximal value in that matrix.

At step 440, in some embodiments, the processor may boost the edit probability of characters with a relatively smaller keyboard distance (as compared to other characters), as explained herein. Since there is a higher likelihood of one character being inadvertently entered instead of another when the two characters are closer together on a keyboard (or other similarly functioning input device) than when they are farther apart, embodiments of the invention may account for this in determining an accurate edit probability of a given character. Therefore, in some embodiments, for each two characters, the processor may compute a keyboard distance per specific keyboard type. For example, in some embodiments this may be computed as the Euclidean distance between key coordinates in a standard QWERTY keyboard configuration (e.g., for physical keyboards and/or virtual keyboards). The processor may then multiply each entry in each confusion matrix by the inverse of the Euclidean distance between the respective key coordinates of any two characters $\{c_i, c_j\}$ in a given keyboard configuration, thereby boosting the edit probability of characters with a relatively smaller keyboard distance as compared with those having a relatively larger keyboard distance.

At step 450, in some embodiments, the processor may tally counts of character frequencies of each character of the various corpora. These character frequencies are later inserted as the denominator in the probability calculation for each error type, as described herein. In some embodiments, the frequencies of single/dual character operations may be calculate based on the information stored in the operation matrices. For example, in the operation del(a,b) (e.g., delete 'b' after 'a') the frequency would be the entry of del(a,b) from the matrix divided by the sum of all (X,b), where X would be the letter 'a' to 'z' (essentially, summing the column of 'b'). For both the initial external corpus and the updated channel-specific corpus (e.g., including the corrected form as determined in step 420), the processor may compute, e.g., for each character and two adjacent characters in a correct word, single-character[ci] and double-characters [ci,ci+1]. For example, for the correct word 'daily' the processor may update the counts of single-characters [d], [a], [i], [l], and [y], and for double-characters[@,d], [d,a], [a,i], [i,l], and [l,y], by one each.

At step 460, in some embodiments, the processor may create a probability index composed of correct word forms and erroneous word forms, and rank the entries of the index, as described herein. In some embodiments, for each word in the interpolated LM produced in accordance with embodiments of method 300, the processor may generate all possible "erroneous" words within a predefined edit distance (e.g., an edit distance of two) e.g., using Damerau-Levenshtein method. For each "erroneous" word and a series of edit operations {E1, E2, . . . }, the processor may then compute the probability of a transition, from 'erroneous' word form to correct word form, e.g., by implementing the following error probability formula for each edit operation Ei, and then multiplying the probabilities:

$$Pr(t|c) = \begin{cases} \dfrac{del[c_{p-1}, c_p]}{chars[c_{p-1}, c_p]}, & \text{if deletion} \\[6pt] \dfrac{add[c_{p-1}, t_p]}{chars[c_{p-1}]}, & \text{if insertion} \\[6pt] \dfrac{sub[t_p, c_p]}{chars[c_p]}, & \text{if substitution} \\[6pt] \dfrac{rev[c_p, c_{p+1}]}{chars[c_p, c_{p+1}]}, & \text{if reversal} \end{cases}$$

In the above error probability formula, the numerator is the value in the appropriate confusion matrix created in step 410, and the denominator is the relevant single-character for insertion and substitution, and relevant double-characters for deletion and reversal. The notation 't' represents the "erroneous" or "noisy" word and the notation 'c' represents the "correct" or "normalized" word.

In some embodiments, once the error probabilities have been computed, the processor may then multiply the probability of transition (P(t|c,type,channel)) with the probability of the word appearing according to the interpolated LM ((P(c|channel), calculated according to embodiments of method 300, step 340), and with the error-type probability prior according to the specific channel (P(type|channel), calculated according to embodiments of method 300, step 340) according to the following formula:

$P(t,c)=P(c|\text{channel})\cdot P(\text{type}|\text{channel})\cdot P(t|c,\text{type},\text{channel})$ Then, at step 470, in some embodiments, the processor may store the results (denoted as the "candidates list"), e.g., in a global candidates hash index where the key to each hash is a correct word form and the values are erroneous forms with the above calculated probabilities.

Figure 5:
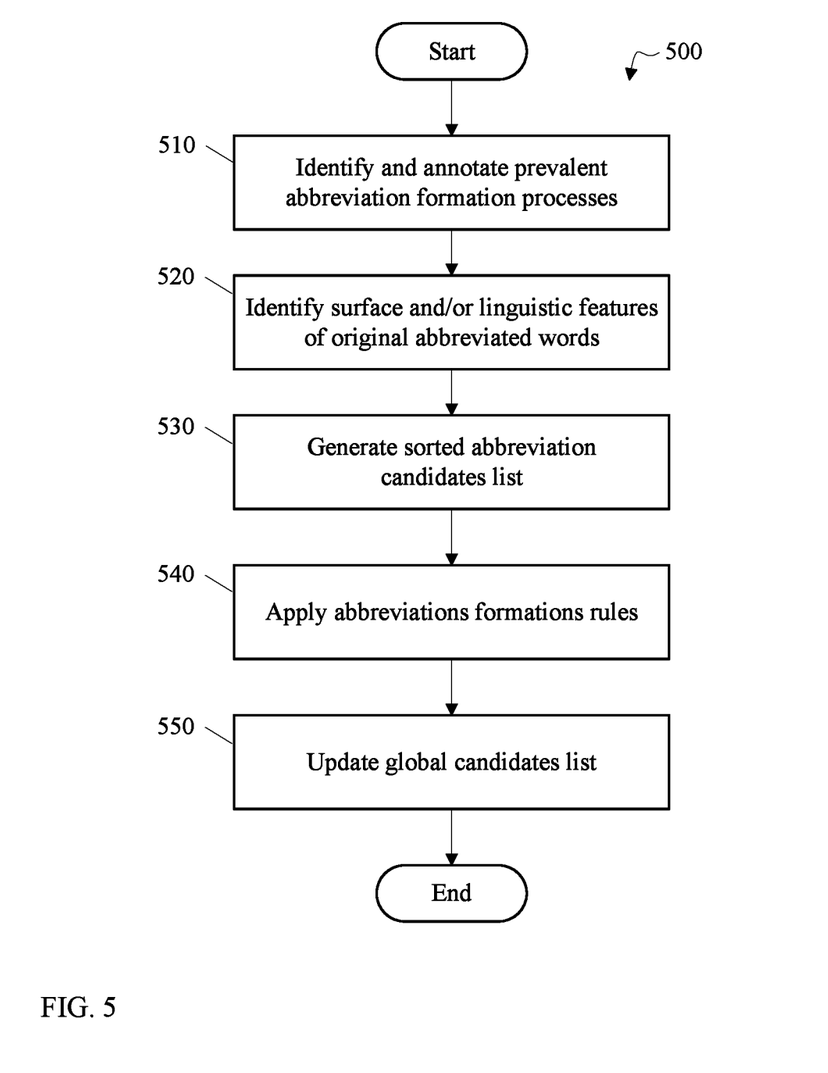
FIG. 5 is a method diagram for creating an abbreviation error-type adapter according to embodiments of the invention.

Turning now to FIG. 5, a method 500 for creating an abbreviation error-type adapter by generating and ranking normalized candidates of abbreviations is described according to embodiments of the invention. In order to create the abbreviation error-type adapter, embodiments of the invention employ linguistic heuristics, motivated by the characteristics and constraints of each noisy channel. For example, in an "Agent Notes" channel, customer call center agents typically summarize interactions with customers during a given call for future internal reference. This real-time constraint heavily affects the text accuracy, as call substance takes precedence over spelling, punctuation, grammar, etc. Other characteristics of the channel are the use of professional jargon and the fact that the text is used between peers, rather than exposed to external eyes. By way of another example, in a call center "Feedback SMS" channel, customers use informal texting language with numerous phonological factors affecting the messages, such as typing "gr8" instead of "great", and "2" instead of "to".

Using these heuristics, backed by a thorough investigation into the prevalent abbreviation formation types, embodiments of the invention create normalized abbreviations candidates for high frequency words and compute a probabilistic score per channel derived from empirical studies. For example, in some embodiments, the heuristics are backed by research examining the types of errors made in certain channels and annotating the forms of errors. For example, in an 'agent notes' channel, users may sometimes create their own abbreviations. These forms may be examined and the probability of that 'error' happening on that specific channel may be calculated.

Method 500 begins at step 510, when, in some embodiments, the processor may identify prevalent abbreviation formation processes using the abbreviation formation lists generated according to embodiments of method 300 as data, and annotate the abbreviations formation lists a accordingly. In other embodiments, step 510 may also or alternatively be performed, e.g., manually by a research assistant, and/or in some automated process, e.g., by a computer implementing artificial intelligence. An example table of annotations of abbreviations according to formation types is shown in Table 2 below:

TABLE 2 example of annotations of abbreviation according to formation types

| Word | Abbreviation | Type of Abbreviation |
|---|---|---|
| family | fam | Back-clipping |
| can | cn | Disemvoweling |
| device | dev | Back-clipping |

Back-clipping refers to a word formation process in which the end of a word is removed, such as, for example, the word "lab" in place of "laboratory". Disemvoweling refers to a word formation process in which vowel letters are removed from a text, such as, for example, "txt" instead of "text".

At step 520, in some embodiments, the processor may identify and/or detect one or more surface features and/or one or more linguistic features of original abbreviated words. Linguistics features, as understood herein, are the morphophonological features of the original word, prior to abbreviation (e.g., types of consonants, the morphological structure of a word, etc.), which represent the linguistic characteristics of the original word. Surface features, as understood herein, are the external characteristics of the original word, such as length of the word or the appearance of certain letters, e.g., 'x'. Examples of such features include: detecting the length of original abbreviated words; detecting morphological features such as prefix, compound, and suffix; detecting phonological features such as sonorants; detecting the frequency of letters in abbreviations as compared with standard language (for example, the letter 'x' is much more prevalent in abbreviations than in standard forms).

At step 530, in some embodiments the processor may generate a sorted abbreviation candidates list. To generate the list, in some embodiments the processor may first detect one or more correlations between the identified prevalent abbreviation processes from step 510 and the surface and linguistic features from step 520. For example, several characteristics (features) may be extracted from the detected OOV words which have been classified as abbreviated 'errors' and the types of abbreviation (such as, e.g., back-clipping/disamvowelling) may be classified. The correlation is done using the channel type, the features and/or the abbreviation type. Then, the processor may use a detected correlation to define a probability, e.g., according to the following equation: Pr(abbv|correct), [Features from step 520]). Finally, the processor may sort candidates according to their respective probabilities, e.g., in descending order.

At step 540, in some embodiments, the processor may apply abbreviation formation rules (e.g., according to the identified Type of Abbreviation, as identified in the Type of Abbreviation column in Table 2 above) on channel-specific high frequency words (e.g., words with a high frequency of occurrence in the channel-specific LM relative to the basic LM), as reflected by the following ratio:

$$\frac{freq \text{ in Channel } LM}{freq \text{ in Basic } LM}$$

At step 550, in some embodiments, the processor may then update the Candidates list, e.g., from method 400, with abbreviation candidates and their respective probabilities. In some embodiments, this can be performed using the same formula and prior probabilities as in step 460 above. Of course, other methods may also be used.

While a spelling error-type adapter (method 400) and an abbreviation error-type adapter (method 500) have been described in detail herein, those of ordinary skill in the relevant art will understand that one or more other error-type adapters may also or alternatively be created and implemented, such as, for example, an acronym error-type adapter, a phonetic shorthand error-type adapter, a stylistic variation error-type adapter, a word concatenation error-type adapter, etc. Word concatenation detection may be accomplished, for example, by using the OOV detector and attempting to insert a space between each character; if the characters on both sized of the inserted space are not OOV then this may indicate that a missing space has been detected. Each additional/alternative error-type adaptor can likewise be tailored to the channel-specific LMs, as generally described herein with regard to the spelling error-type adapter (method 400) and an abbreviation error-type adapter (method 500).

Figure 6:
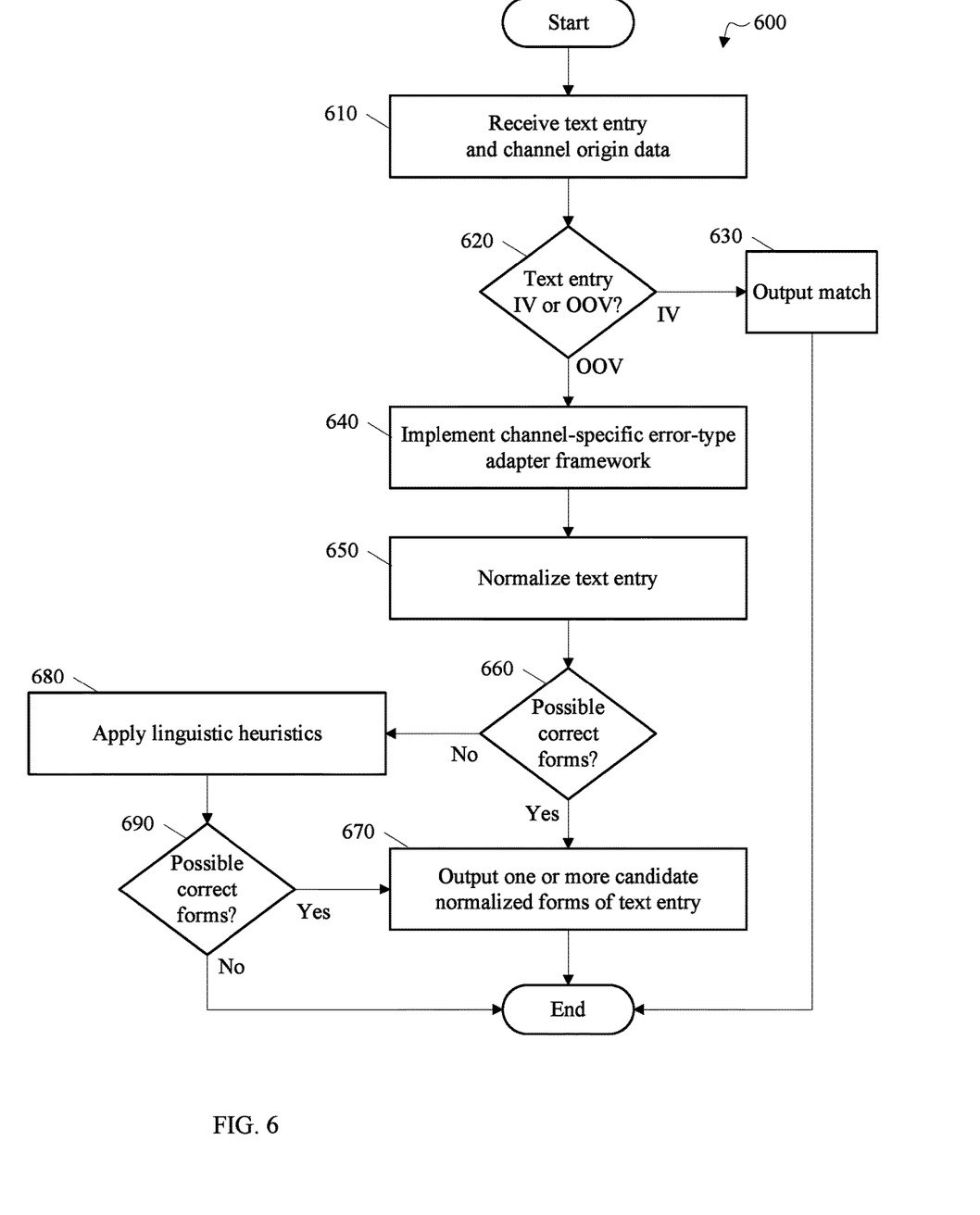
FIG. 6 is a method diagram for text normalization in a plurality of noisy channels according to embodiments of the invention.

Turning now to FIG. 6, a method 600 for text normalization in a plurality of noisy channels is described according to embodiments of the invention. Method 600 begins at step 610, when the processor receives a text entry and channel origin data of the text entry. Channel origin data may include information indicating from which channel the text entry originated, e.g., from a SMS communication channel, an Instant Messaging communication channel, an "Agent Notes" channel, an e-mail channel, a social media channel, a data feed (e.g., a ticker feed) channel, etc. In some embodiments, channel origin data may be in the form of a tag or other metadata appended to or otherwise associated with a text entry.

In some embodiments, a received text entry may include a non-alphanumeric character. For example, many social networks provide for the creating of labels or tags, commonly referred to as a "hashtag", which allow users to find a specific theme or content by search for the hashtag. A hashtag is created by a user placing the "#" character (e.g., the number sign) immediately preceding a word (e.g., "#fail"), forming a hashtag of that word. Therefore, in some embodiments, the processor may scan received text entries for any characters that are non-alphanumeric and remove such non-alphanumeric characters from the text entry.

At step 620, the processor may determine whether the text entry matches an in-vocabulary (IV) entry or whether the text entry is an out-of-vocabulary (OOV) entry. For example, in some embodiments, if a received text entry matches a correct word form, e.g., in the global candidates hash index, without requiring any normalization, it is considered to be an IV entry. Alternatively, if the received text entry does not match a correct word form, e.g., in the global candidates hash index, it is considered to be an OOV entry.

If the text entry is determined to have a matching IV entry, then at step 630 the processor may output the matching IV entry and the method ends. However, if the text entry is determined to be an OOV entry, then at step 640 the processor may implement a channel-specific error-type adapter framework based on the channel origin data, as described herein. In some embodiments, this may include identifying the relevant channel-specific error-type adapter framework based on the channel origin data, so that the OOV entry can be evaluated in the context of channel from which is originated. Since the channel-specific error-type adapter framework is optimized for a specific channel from which the text entry originated, evaluating OOV text entries using the channel-specific error-type adapter framework provides a higher likelihood the OOV text entry may be identified than if the OOV text entry were identified using a generic framework.

At step 650, in some embodiments, the processor may normalize the text entry using the channel-specific error-type adapter framework. As described in detail herein, the channel-specific error-type adapter framework may include one or more of a plurality of error-type adapters that have been previously created in order to address specific error-types common to a particular (specific) channel. In some embodiments, each error-type adaptor may be configured to model a different type of error to be normalized. In some embodiments, this may include, for example, an spelling error-type adapter (described in detail with reference to FIG. 4); an abbreviation error-type adapter, (described in detail with reference to FIG. 5); and/or one or more other error-type adapters such as, for example, an acronym error-type adapter, a phonetic shorthand error-type adapter, a stylistic variation error-type adapter, a word concatenation error-type adapter, etc. By implementing the channel-specific error-type adapter framework, the processor may calculate the probability of particular channel-specific errors occurring in a given channel, and thus determine, with higher predictability, a correct form of an 'erroneous' OOV text entry. For example, if a received text entry is a concatenation of two words in the LM (e.g., missing a space), the processor may calculate the probability of inserting a space based on empirical testing.

At step 660, in some embodiments, the processor may determine whether there any candidate normalized forms of the text entry have been identified. If so, then at step 670, the processor may output one or more candidate normalized forms of the text entry. In some embodiments, this may include returning a list of possible correct forms of the 'erroneous' word, given the correction candidates list pre-calculated by the various error-type adapters, and the method ends. In some embodiments, the candidates list may provide the candidate normalized forms, e.g., in descending order, based on the respective probabilities of the candidate forms.

If no candidate normalized forms of the text entry have been identified, then at step 680, in some embodiments, the processor may expand the channel-specific error-type adapter framework, for example, by applying linguistic heuristics, e.g., based on Neologism construction in natural languages on LM words. For certain high frequency words, for example, belonging to the "funnel" Levin verb class, a text entry identified as a verb belonging to that class may be converted into an adverb: verb+y (e.g., push→push). For other high frequency words, e.g., belonging to the "contribute" or "build" Levin verb classes then a text entry identified as a verb belonging to that class may be modified to include the "re" prefix, such that the result is also a verb: prefix+verb (e.g., submit→resubmit, build→rebuild). In some embodiments, for text entries which have a high ratio frequency in the channel-specific LM to frequency in the basic LM, the processor may inflect such words as if they were verbs (e.g., text→texting, texted). Of course, in other embodiments, other types of linguistic heuristics and/or other Levin verb classes may be applied as well or in the alternative.

At step 690, in some embodiments, the processor may again determine whether there any candidate normalized forms of the text entry have been identified, e.g., with based on the expanded the channel-specific error-type adapter framework. If so, then the processor may output one or more candidate normalized forms of the text entry (step 670), and the method ends. If no candidate normalized forms have been identified, in some embodiments the text entry may be returned, e.g., with a message indicating that the text entry has not been identified, and the method ends.

Unless explicitly stated, the method embodiments described herein are not constrained to a particular order or sequence. Furthermore, all formulas described herein are intended as examples only and other or different formulas may be used. Additionally, some of the described method embodiments or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method for text normalization in a plurality of noisy channels, performed on a computing device having a processor, memory, and one or more code sets stored in the memory and executing in the processor, the method comprising:
   generating a set of models for a respective set of communication channels;
   generating, based on the set of models, a respective set of channel specific error-type adapter frameworks, wherein each of the channel-specific error-type adapter frameworks is optimized for a respective communication channel;
   receiving, by the processor, a text entry and channel origin data of the text entry;
   determining, by the processor, whether the text entry matches an in-vocabulary (IV) entry or whether the text entry is an out-of-vocabulary (OOV) entry;
   if the text entry is determined to have a matching IV entry:
      outputting, by the processor, the matching IV entry; and
   if the text entry is determined to be an OOV entry:
      implementing, by the processor, the relevant channel-specific error-type adapter framework based on the channel origin data;
         wherein the channel-specific error-type adapter framework is optimized for the specific channel from which the text entry originated; and
         wherein the channel-specific error-type adapter framework further comprises a probabilistic model of one or more error-type priors in the specific channel;
      normalizing, by the processor, the text entry using the channel-specific error-type adapter framework;
         wherein the channel-specific error-type adapter framework comprises one or more error-type adapters;
         wherein the one or more error-type adapters comprise at least one of a spelling error-type adapter, an abbreviation error-type adapter, an acronym error-type adapter, a phonetic shorthand error-type adapter, and a word concatenation error-type adapter; and
         wherein each error-type adaptor is configured to model a different type of error to be normalized; and
      outputting one or more candidate normalized forms of the text entry.

2. The method of claim 1, comprising an initial step of building an interpolated language model and one or more static lexicons to be implemented when normalizing the text entry using the channel-specific error-type adapter framework.

3. The method of claim 2, wherein the interpolated language model comprises a merged combination of a basic language model and one or more channel-specific language models.

4. The method of claim 2, wherein the one or more static lexicons comprise at least one of a proper name lexicon, an abbreviation lexicon, and an acronym lexicon.

5. The method of claim 1, wherein the spelling error-type adapter is generated using one or more matrices, each matrix computing a probability of a specific edit operation being performed to identify a spelling error correction.

6. The method of claim 1, further comprising applying linguistic heuristics to expand the channel-specific error-type adapter framework.

7. A system for text normalization in a plurality of noisy channels, comprising:
   a processor;
   a memory; and
   one or more code sets stored in the memory and executing in the processor, which, when executed, configure the processor to:
      generate a set of models for a respective set of communication channels;
      generate, based on the set of models, a respective set of channel specific error-type adapter frameworks, wherein each of the channel-specific error-type adapter frameworks is optimized for a respective communication channel;
      receive a text entry and channel origin data of the text entry;
      determine whether the text entry matches an in-vocabulary (IV) entry or whether the text entry is an out-of-vocabulary (OOV) entry;
      if the text entry is determined to have a matching IV entry:
         output the matching IV entry; and
      if the text entry is determined to be an OOV entry:
         implement the relevant channel-specific error-type adapter framework based on the channel origin data;
            wherein the channel-specific error-type adapter framework is optimized for the specific channel from which the text entry originated; and
            wherein the channel-specific error-type adapter framework further comprises a probabilistic model of one or more error-type priors in the specific channel;
         normalize the text entry using the channel-specific error-type adapter framework;
            wherein the channel-specific error-type adapter framework comprises one or more error-type adapters;
            wherein the one or more error-type adapters comprise at least one of a spelling error-type adapter, an abbreviation error-type adapter, an acronym error-type adapter, a phonetic shorthand error-type adapter, and a word concatenation error-type adapter; and
            wherein each error-type adaptor is configured to model a different type of error to be normalized; and
         output one or more candidate normalized forms of the text entry.

8. The system of claim 7, wherein the one or more code sets further configure the processor to build an interpolated language model and one or more static lexicons to be implemented when normalizing the text entry using the channel-specific error-type adapter framework.

9. The system of claim 8, wherein the interpolated language model comprises a merged combination of a basic language model and one or more channel-specific language models.

10. The system of claim 8, wherein the one or more static lexicons comprise at least one of a proper name lexicon, an abbreviation lexicon, and an acronym lexicon.

11. The system of claim 7, wherein the one or more code sets configure the processor to generate the spelling error-type adapter using one or more matrices, each matrix computing a probability of a specific edit operation being performed to identify a spelling error correction.

12. The system of claim 7, further comprising applying linguistic heuristics to expand the channel-specific error-type adapter framework.

13. A method for text normalization in a plurality of noisy channels, performed on a computing device having a processor, memory, and one or more code sets stored in the memory and executing in the processor, the method comprising:

- generating a set of models for a respective set of communication channels;
- generating, based on the set of models, a respective set of channel specific error-type adapter frameworks, wherein each of the channel-specific error-type adapter frameworks is optimized for a respective communication channel;
- receiving, by the processor, a text entry and channel origin data of the text entry;
- determining, by the processor, whether the text entry matches an in-vocabulary (IV) entry or whether the text entry is an out-of-vocabulary (OOV) entry;
  - wherein the matching IV entry is outputted when the text entry is determined to have a matching IV entry,
  - wherein a relevant channel-specific error-type adapter framework is implemented based on the channel origin data when the text entry is determined to be an OOV entry,
  - wherein the channel-specific error-type adapter framework is optimized for the specific channel from which the text entry originated; and
  - wherein the channel-specific error-type adapter framework further comprises a probabilistic model of one or more error-type priors in the specific channel;
- normalizing, by the processor, the text entry using the channel-specific error-type adapter framework;
  - wherein the channel-specific error-type adapter framework comprises one or more error-type adapters;
  - wherein the one or more error-type adapters comprise at least one of a spelling error-type adapter, an abbreviation error-type adapter, an acronym error-type adapter, a phonetic shorthand error-type adapter, and a word concatenation error-type adapter; and
  - wherein each error-type adaptor is configured to model a different type of error to be normalized; and
- outputting one or more candidate normalized forms of the text entry.

* * * * *